(12) United States Patent
Smith et al.

(10) Patent No.: US 6,981,931 B2
(45) Date of Patent: Jan. 3, 2006

(54) METHOD AND APPARATUS FOR PROVIDING MOMENTARY TORQUE REVERSAL FOR A TRANSMISSION HAVING AN AUTOMATED SHIFT SYSTEM

(75) Inventors: Wade A. Smith, Imlay City, MI (US); Thomas A. Genise, Dearborn, MI (US)

(73) Assignee: Eaton Corporation, Cleveland, OH (US)

( * ) Notice: Subject to any disclaimer, the term of this patent is extended or adjusted under 35 U.S.C. 154(b) by 130 days.

(21) Appl. No.: 10/799,983

(22) Filed: Mar. 12, 2004

(65) Prior Publication Data

US 2005/0202928 A1 Sep. 15, 2005

(51) Int. Cl.
 *B60K 41/02* (2006.01)
(52) U.S. Cl. ............... 477/70; 477/77; 477/79; 477/111; 477/112; 74/335; 74/339
(58) Field of Classification Search ......... 477/30, 477/70, 77, 79, 111, 112; 74/335, 339
See application file for complete search history.

(56) References Cited

U.S. PATENT DOCUMENTS

| | | | | |
|---|---|---|---|---|
| 5,511,437 A | | 4/1996 | Braun | |
| 5,729,454 A | * | 3/1998 | Amsallen | 701/51 |
| 5,735,770 A | * | 4/1998 | Omote et al. | 477/5 |
| 6,393,928 B1 | * | 5/2002 | Watanabe | 74/336 R |
| 6,561,948 B2 | | 5/2003 | Markyvech et al. | |
| 6,634,986 B2 | * | 10/2003 | Kima | 477/107 |
| 6,692,406 B2 | * | 2/2004 | Beaty | 477/32 |
| 6,916,270 B2 | * | 7/2005 | Genise | 477/102 |
| 2005/0164827 A1 | * | 7/2005 | Beaty et al. | 477/3 |

\* cited by examiner

*Primary Examiner*—Tisha Lewis
*Assistant Examiner*—David D. Le
(74) *Attorney, Agent, or Firm*—Brooks Kushman P.C.

(57) ABSTRACT

An automated vehicle transmission having a wet clutch and an auxiliary motor that is operatively connected to the transmission to overcome residual torque forces in the wet clutch. Residual torque forces in the wet clutch may prevent disengagement of a gear train and also prevent the transmission from shifting into neutral. A control system determines whether residual torque is resisting the disengagement of the gear train for more than a predetermined time period. According to the method, if a shift is delayed for more than the predetermined time period, the auxiliary motor is actuated to apply an oppositely oriented torque to the transmission gear train to overcome the residual torque and allow the transmission to shift into neutral.

15 Claims, 3 Drawing Sheets

METHOD AND APPARATUS FOR PROVIDING MOMENTARY TORQUE REVERSAL FOR A TRANSMISSION HAVING AN AUTOMATED SHIFT SYSTEM

BACKGROUND OF THE INVENTION

1. Field of the Invention

The present invention relates to transmissions having an automated shift system.

2. Background Art

Transmissions for vehicles having an automated shift mechanism have been developed that automatically shift a shift lever mechanism similar to a manual transmission shift mechanism. One example of such a transmission has been developed for medium and heavy-duty trucks is known as the "AutoShift" transmission by Applicants' assignee primarily for medium and heavy-duty trucks. This system uses an electronic control that operates X-Y motors in a shift actuator to shift between a plurality of different gear trains to provide a range of gear ratios. Using this technique, operation of a vehicle is simplified and shifting performance may be optimized by reducing or minimizing human error. While the AutoShift system has proven effective in higher gear ratios, in lower gear ratios when the truck is operated at slow speeds, it would be desirable to provide quicker shift response when shifting from gear to gear.

In some transmission applications, it may be preferred to provide a wet clutch to disengage the transmission from the vehicle engine or source of drive torque to provide superior clutch durability. The torque load to the transmission is relieved by disengaging the clutch. Disengaging the clutch theoretically permits the torque load to go to zero and allows the transmission system to shift into neutral and prior to changing gears. However, with a wet clutch, even a small amount of rotation between the transmission and engine may cause the wet clutch to remain sufficiently engaged to prevent the transmission from being shifted into neutral. A wet clutch resists pulling to neutral as a result of "torque lock" caused by viscous drag in the wet clutch which may be as little as seven foot pounds of torque. The viscous drag is caused by the shearing of fluid between members that have a speed differential in the clutch pack.

If an X-Y shifter is provided, it may not be able to overcome the residual torque. If the X-Y shifter motors cannot overcome the residual torque, shifting will be delayed until the torque is reduced sufficiently to be overcome by the X-Y shifter motors. The time required to fully disengage the clutch may lead the operator to believe that the transmission is sticking or not properly shifting. A delay of a half a second or more may be noticeable to an operator.

There is a need for a control system and method of operating a vehicle transmission system that breaks, or reverses, the torque load resulting from wet clutch viscous drag. By counteracting the torque load from the wet clutch, one gear set can be disengaged allowing the transmission to be shifted into neutral. These and other problems facing prior art vehicle transmission systems are addressed by Applicants' invention as summarized below.

SUMMARY OF THE INVENTION

According to one aspect of the present invention, a vehicle transmission is provided that provides a plurality of selectable speed ratios. The transmission comprises an input shaft that receives torque in a first direction of rotation that is directed to a plurality of gear sets that each selectively provide one of the plurality of gear ratios. Each gear set comprises a plurality of gears that are arranged in a drivetrain. A wet master clutch is disengaged to facilitate sufficient disengagement of the engine from the transmission allowing the transmission to change from one gear set to another. Residual viscous drag torque may be created by the wet clutch that, in some circumstances, resists disengagement of the transmission. The transmission may also include at least one shift motor that shifts the transmission from one gear set to a neutral position between gear sets and then to another gear set. The control system determines whether shifting the transmission into neutral is delayed for more than a predetermined time period. If so, an auxiliary motor may apply torque in a second direction of rotation that is opposite to the first direction of rotation when the control system determines that shifting into a neutral position is delayed for more than the predetermined period of time. Applying torque in the second direction overcomes the residual clutch drag torque and thereby facilitates shifting the transmission into the neutral position by creating a torque reversal across the transmission.

According to other aspects of the invention as they relate to the vehicle transmission embodiment of the invention, the auxiliary motor is provided with an axially shifted gear that engages a gear in the transmission. An example of such an auxiliary motor and an axially shifted gear combination is commonly referred to as a Bendix motor. The auxiliary motor may be a fluid driven motor such as a hydraulic or pneumatic motor. Alternatively, the auxiliary motor could be an electric motor, or the like. The auxiliary motor may engage a gear that is attached to the input shaft or, if the transmission is provided with a counter shaft, the auxiliary motor may engage a gear that is attached to the counter shaft or is meshed to the counter shaft. The auxiliary motor may be connected to the transmission through a power take off connection or may be connected in another location on the housing of the transmission.

According to another aspect of the invention as it relates to the transmission, the control system may signal the auxiliary motor to disengage the gear after the transmission shifts to neutral. According to another aspect of the invention as it relates to the transmission, at least one shifter motor may further comprise a set of X-Y shifter motors. A position sensor may be disposed in the set of X-Y shifter motors when the position sensor provides a signal to the control system that is used to determine whether the transmission is in the neutral position.

According to another aspect of the invention, a method of controlling an automated vehicle transmission system is provided. The transmission system receives torque in the first direction of rotation from an engine. A multiple speed transmission that has a wet clutch, disengages the wet clutch to permit shifting the transmission into a neutral position that is subject to a residual torque in the first direction of rotation. A control unit is provided for shifting the transmission. The method comprises the steps of determining if the residual torque is delaying movement of the transmission into the neutral position for more than the predetermined period of time. If so, a reverse output torque is applied to the transmission in a second direction of rotation to counteract the residual torque and allow the transmission to be placed into neutral.

According to another aspect of the invention as it relates to the method of controlling the automated vehicle transmission, the method may further include the step of determining if a transmission neutral mode or gear change has been selected but not achieved within the predetermined time period.

According to another aspect of the method, the step of applying a reverse output torque further comprises providing an auxiliary motor that engages a gear that is attached to the input shaft. Alternatively, reverse output torque may be applied by the auxiliary motor engaging a gear that is attached to a counter shaft.

Another aspect of the method may comprise the step of stopping the application of reverse output torque when the control system determines that the transmission is in the neutral position.

According to another aspect of the method, the step of determining whether the residual torque is delaying movement may further comprise monitoring the position sensor disposed in the set of X-Y shifter motors and by providing a signal to the control system to determine whether the transmission is in the neutral position.

These and other aspects of the vehicle transmission and method of controlling the vehicle transmission of the present invention will be better understood in view of the attached drawings when taken in connection with the detailed description of the illustrated embodiments of the invention.

DETAILED DESCRIPTION OF THE PREFERRED EMBODIMENT(S)

Figure 1:
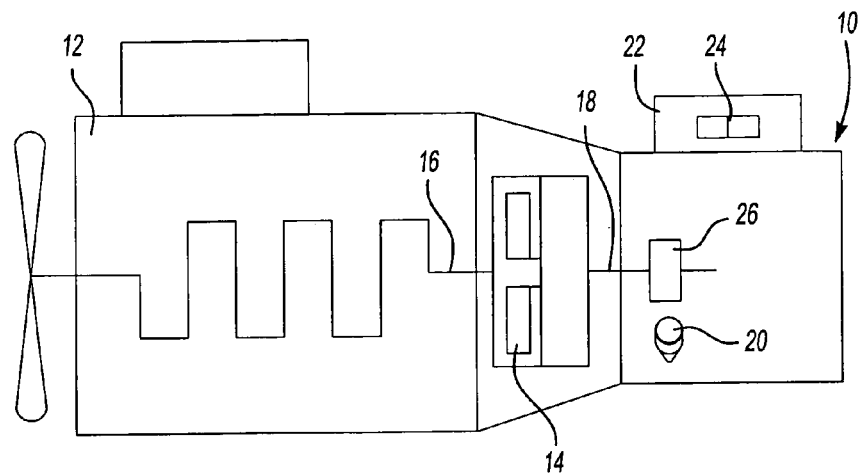
FIG. 1 is a schematic illustration of an automated vehicle transmission system according to the present invention.

Referring now to FIG. 1, a vehicle transmission 10 and engine 12 of a vehicle (not shown) are connected by a wet clutch 14. The wet clutch 14 connects the drive shaft 16 of the engine 12 to an input shaft 18 of the transmission 10. The wet clutch 14 allows for hydrostatic engagement and disengagement of the transmission 10 by the engine 12.

The wet clutch 14 provides increased durability in comparison to a dry clutch. The wet clutch 14 is of conventional design and relies upon fluids such as oil (natural, synthetic or any other combination) to cool the clutch pack that may become heated as a result of repeated engagements and disengagements. While the wet clutch 14 provides an interrupt mechanism for drive line torque, in certain applications, if a limited amount of residual torque is present in the clutch due to viscous drag, it will make the gear train difficult to disengage and pull to neutral. Residual torque of seven foot pounds or more in the wet clutch 14 may be sufficient to prevent the gear train from being pulled to neutral.

According to one embodiment of the invention, an auxiliary motor 20 (that may be of the type that is commonly referred to as a "Bendix" motor) may be provided to overcome the residual torque counteracting the residual torque generated by a wet clutch. Counteracting the residual viscous torque allows the gear train to disengage. A control system 22 is provided on the transmission to control shifting the transmission into different gear ratios. The control system 22 may comprise a shifter motor or a set of X-Y shifter motors 24 that provide automated shifting of a transmission. The X-Y shifter motors 24 act upon a shift bar housing (not shown) to move the gear selection mechanism in a shift pattern comparable to a manual shift pattern of a conventional manual transmission.

The auxiliary motor 20 engages a gear 26 within the transmission 10 to exert a reverse torque that counteracts the residual torque and permits the control system 22 to shift the transmission out of one gear into neutral and into a new gear ratio.

Figure 2:
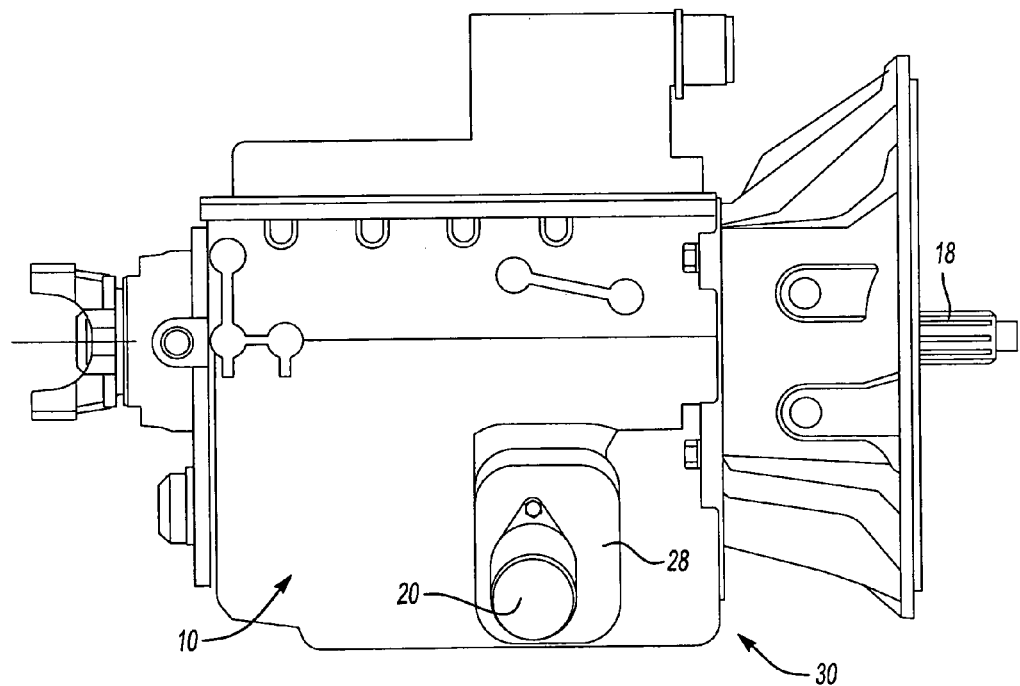
FIG. 2 is a side elevation view of one embodiment of a transmission system made in accordance with the present invention.

Referring now to FIG. 2, a transmission 10 is shown that has an auxiliary motor 20 mounted to a side mounting plate 28. The side mounting plate 28 secures the auxiliary motor 20 to a housing 30 of the transmission 10. The input shaft 18 of the transmission 10 is provided at the engine end of the transmission 10 while the auxiliary motor 20 is secured to a transmission housing 30 and extends radially relative to the input shaft 18.

Figure 3:
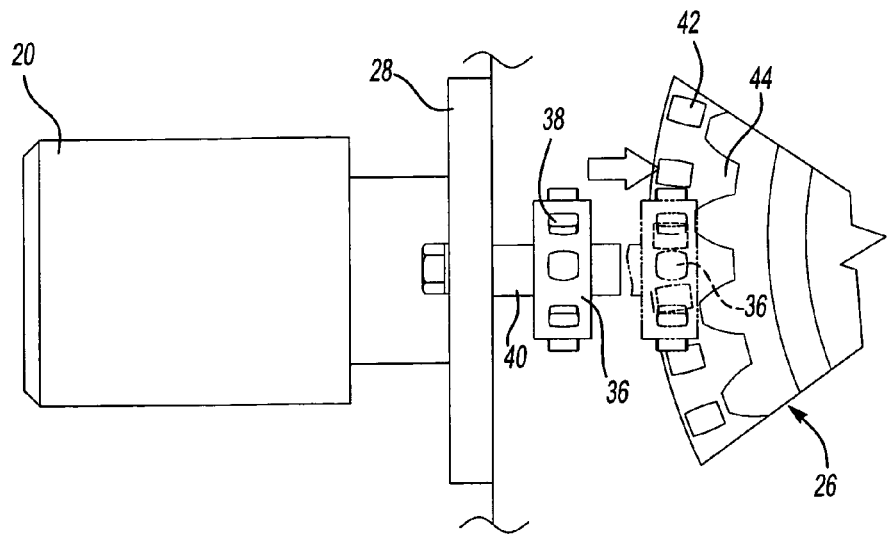
FIG. 3 is a fragmentary schematic view of a portion of a vehicle transmission including an auxiliary motor adapted to engage a gear of the transmission.

Referring now to FIG. 3, the auxiliary motor 20 is shown with the side mounting plate 28. An axially shifted gear 36 having a plurality of gear teeth 38 is secured to a shaft 40. The shaft 40 is axially shiftable relative to the auxiliary motor 20 to cause the gear teeth 38 of the axially shifted gear 36 to engage axially extending gear teeth 42 that extend in an axial direction relative to the gear 26. The axially extending gear teeth 42 are provided on a side wall 44, or flange, that is associated with the gear 26. The gear 26 may be an input shaft gear or any other gear that may transmit reversely oriented torque through the transmission to the wet clutch 14.

In operation, the auxiliary motor 20 is actuated by the control system 22 of the transmission 10 when it is desired to shift a transmission but residual torque present in the wet clutch prevents disengagement of the gear train. If the residual torque present in the wet clutch prevents disengagement, the gear train may not disengage and the transmission 10 may not shift into neutral within the predetermined time period. If, for example, residual torque prevents the gear train from disengaging for a period of more than one half of a second, the control system 22 may actuate the auxiliary motor 20. When the auxiliary motor 20 is actuated, the shaft 40 shifts the axially shifted gear 36 causing gear teeth 38 to engage gear teeth 38 of the gear 26. The auxiliary motor 20 applies torque to the gear 26 that in turn imparts torque to the wet clutch 14 countering the residual torque. When the control system determines that the transmission is in neutral, application of torque to the gear 26 is stopped by turning off the auxiliary motor 20 and retracting the axially shifted gear 36.

Figure 4:
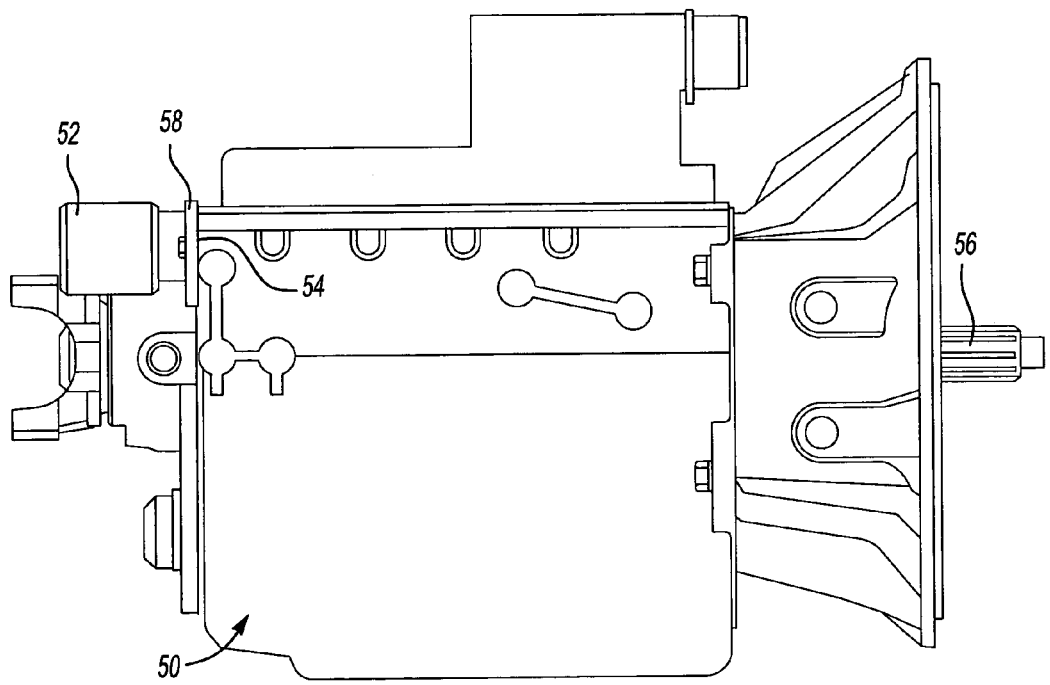
FIG. 4 is a side elevation view of a vehicle transmission equipped with an alternative embodiment of an auxiliary motor of the present invention.

Referring now to FIG. 4, an alternative embodiment of the present invention is shown wherein a transmission 50 is provided with a power take off (PTO) mounted auxiliary motor 52. The auxiliary motor 52 is secured to a PTO connection port 54. The PTO connection port 54 in the illustrated embodiment is disposed on the opposite end of the transmission from input shaft 56. Input shaft 56 is adapted to be operatively connected to an engine (not shown). The PTO mount auxiliary motor 52 is secured to the PTO connection port 54 by a PTO connector 58. The PTO mount auxiliary motor 52 is disposed in the same axial orientation as the input shaft 56.

Figure 5:
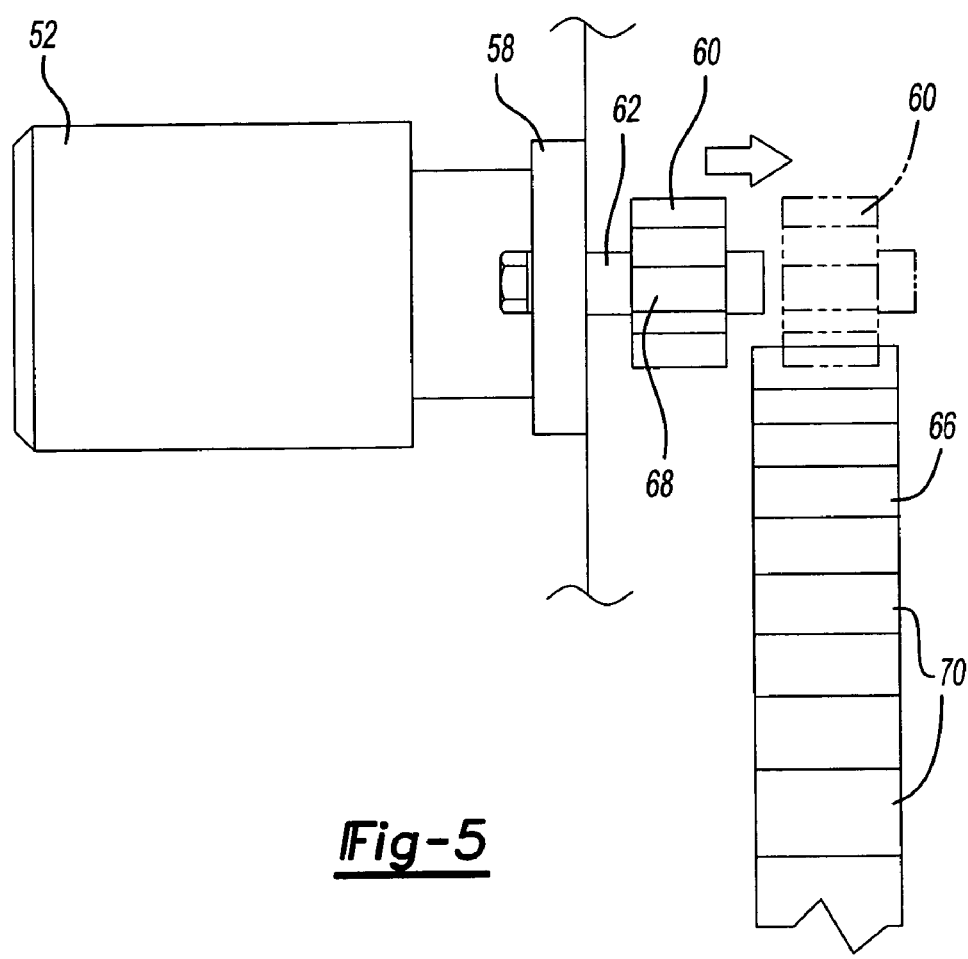
FIG. 5 is a fragmentary side elevation view of an auxiliary motor of the embodiment shown in FIG. 4.

Referring to FIG. 5, the PTO mounted auxiliary motor 52 is shown with the PTO connector 58. The auxiliary motor 52 has an axially shifted gear 60 that is mounted on an extensible shaft 62 that is driven by the auxiliary motor 52. The extensible shaft 62 shifts the axially shifted gear 60 into engagement with a gear 66 that is located adjacent to the PTO. The gear 66 may be mounted on a counter shaft of the transmission or, alternatively, may be mounted on the input shaft of a transmission. It may also be any other gear of the transmission that is continuously and constantly meshed with the gear train connected to the input shaft. A plurality of gear teeth 68 are provided on the gear 60 that engage gear teeth 70 on the gear 66.

In operation, the auxiliary motor 52 is actuated when the engine control system 22 determines that the gear train is locked up as a result of residual torque forces within the wet clutch. The control system 22 actuates the auxiliary motor 52 causing the motor to operate and also axially shift the gear 60 into engagement with the gear 66. Rotation of the gear 60 provides torque that is applied to the gear 66. The torque applied to the gear 66 is directed in the opposite direction relative to the residual torque in the wet clutch 14 to overcome the residual torque. This creates a torque reversal across the transmission and allows the transmission to shift into neutral. After the transmission is shifted into neutral, the control system may stop the application of torque to the gear 66. The control system 22 may then act through the X-Y shift motor 24 to shift the transmission into the next desired gear ratio.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle transmission for providing a plurality of selectable speed ratios, comprising:
    an input shaft that receives torque in a first direction of rotation,
    a plurality of gear sets that each selectively provide one of the plurality of gear ratios, wherein each gear set has a plurality of gears arranged in a gear train;
    a wet master clutch may be disengaged to facilitate sufficient disengagement of the engine from the transmission, allowing the transmission to change from one of the gear sets to another gear set, wherein a residual torque in the wet clutch caused by viscous drag resists disengagement of the transmission;
    at least one shifter motor shifts the transmission from one gear set, to a neutral position between gear sets, and to another gear set;
    a control system determines if shifting of the transmission into the neutral position is delayed for more than a predetermined period; and
    an auxiliary motor is operatively connected to the transmission to selectively apply torque in a second direction of rotation that is opposite to the first direction of rotation when the control system determines that shifting into the neutral position is delayed for more than the predetermined period to overcome the residual torque and thereby facilitate shifting the transmission to the neutral position.

2. The transmission of claim 1 further comprising a power take off connection provided on the transmission and wherein the auxiliary motor is connected to the transmission at the power take off connection.

3. The transmission of claim 1 wherein the control system signals the auxiliary motor to disengage the gear after the transmission shifts to neutral.

4. The transmission of claim 1 wherein the at least one shifter motor further comprises a set of X-Y shifter motors, and wherein a position sensor is disposed in the set of X-Y shifter motors, the position sensor providing a signal to the control system that is used to determine whether the transmission is in the neutral position.

5. The transmission of claim 1 wherein the auxiliary motor engages a gear that is attached to the input shaft.

6. The transmission of claim 1 wherein a counter shaft is provided and wherein at least some of the gears are attached to the counter shaft and the auxiliary motor engages one of the gears that is attached to the counter shaft, or is meshed to the counter shaft.

7. The transmission of claim 1 wherein the auxiliary motor is provided with an axially shifted gear that engages a gear in the transmission.

8. The transmission of claim 7 wherein the auxiliary motor is a fluid driven motor.

9. The transmission of claim 8 wherein the fluid driven motor is a hydraulic motor.

10. A method for controlling an automated vehicular transmission system that receives torque in a first direction of rotation from an engine, a multiple speed transmission having a wet clutch that is disengaged to permit shifting the transmission into a neutral position, the wet clutch being subject to a residual torque in the first direction of rotation caused by the shearing of fluid between elements of the wet clutch that have a speed differential, and a control unit for shifting the transmission, the method comprising the steps of:
    (a) determining if the residual torque is delaying movement of the transmission into the neutral position for more than a predetermined period; and
    (b) applying a reverse output torque to the transmission in a second direction of rotation when the control system determines that the predetermined period is exceeded to counteract the residual torque and allow the transmission to move to the neutral position.

11. The method of claim 10, further including the step of determining if a transmission neutral mode or a gear change has been selected but not achieved within the predetermined time period.

12. The method of claim 10, wherein the step of applying a reverse output torque further comprises providing an auxiliary motor that engages a gear that is attached to the input shaft.

13. The method of claim 10, wherein the step of applying a reverse output torque further comprises providing an auxiliary motor that engages a gear that is attached to a counter shaft and the auxiliary motor engages a gear that is attached to the counter shaft.

14. The method of claim 10, further comprising the step of stopping the application of the reverse output torque when the control system determines that the transmission is in the neutral position.

15. The method of claim 10, wherein the step of determining if the residual torque is delaying movement further comprises monitoring a position sensor disposed in a set of X-Y shifter motors and providing a signal to the control system to determine whether the transmission is in the neutral position.

* * * * *